United States Patent
Chung et al.

(10) Patent No.: US 10,852,237 B2
(45) Date of Patent: Dec. 1, 2020

(54) MICROARRAY, IMAGING SYSTEM AND METHOD FOR MICROARRAY IMAGING

(71) Applicant: Centrillion Technologies Taiwan Co. LTD., Hsinchu County (TW)

(72) Inventors: Yao-Kuang Chung, Hsinchu County (TW); Jui-Hung Hung, Hsinchu County (TW); Chao-Hsi Lee, Hsinchu County (TW)

(73) Assignee: Centrillion Technologies Taiwan Co., LTD., Hsinchu County (TW)

( * ) Notice: Subject to any disclaimer, the term of this patent is extended or adjusted under 35 U.S.C. 154(b) by 47 days.

(21) Appl. No.: 16/357,331

(22) Filed: Mar. 19, 2019

(65) Prior Publication Data

US 2019/0293563 A1    Sep. 26, 2019

Related U.S. Application Data

(60) Provisional application No. 62/647,837, filed on Mar. 26, 2018.

(51) Int. Cl.
*G01N 21/64*    (2006.01)

(52) U.S. Cl.
CPC ..... *G01N 21/6456* (2013.01); *G01N 21/6454* (2013.01)

(58) Field of Classification Search
CPC ............... G01N 21/6452; G01N 21/64; G01N 21/6454; G01N 2021/6441
See application file for complete search history.

(56) References Cited

U.S. PATENT DOCUMENTS

| | | | |
|---|---|---|---|
| 6,215,894 B1 | 4/2001 | Zeleny et al. | |
| 7,769,548 B2 | 8/2010 | Garcia | |
| 7,961,323 B2 | 6/2011 | Tibbetts | |
| 2004/0080661 A1 | 4/2004 | Afsenius et al. | |
| 2005/0221351 A1 | 10/2005 | Ryu | |
| 2015/0338345 A1* | 11/2015 | Lakowicz | G01N 33/552 435/5 |
| 2016/0304940 A1 | 10/2016 | Segale et al. | |
| 2018/0164699 A1* | 6/2018 | Tukker | G03F 7/70625 |

FOREIGN PATENT DOCUMENTS

| | | |
|---|---|---|
| TW | 200944777 | 11/2009 |
| TW | I530272 | 4/2016 |
| TW | 201630406 | 8/2016 |
| TW | I614500 | 2/2018 |

OTHER PUBLICATIONS

"Office Action of Taiwan Counterpart Application", dated Aug. 28, 2020, p. 1-p. 10.

* cited by examiner

*Primary Examiner* — Asghar H Bilgrami
(74) *Attorney, Agent, or Firm* — JCIPRNET (57) ABSTRACT

A microarray including a plurality of detection areas and at least one mark is provided. The plurality of the detection areas are arranged in an array. The at least one mark is disposed among or beside the plurality of the detection areas. The at least one mark is configured for at least one of image focusing, positioning and splicing, wherein the at least one mark comprises a plurality of grid dots distributed in an area. The area comprises a plurality of zones arranged in an array, each of the plurality of the grid dots is disposed in one of the plurality of the zones, a number of the plurality of the grid dots is less than a number of the plurality of the zones, and the plurality of the grid dots form a two-dimensional pattern.

19 Claims, 5 Drawing Sheets

MICROARRAY, IMAGING SYSTEM AND METHOD FOR MICROARRAY IMAGING

CROSS-REFERENCE TO RELATED APPLICATION

This application claims the priority benefits of U.S. provisional application Ser. No. 62/647,837, filed on Mar. 26, 2018. The entirety of the above-mentioned patent application is hereby incorporated by reference herein and made a part of this specification.

BACKGROUND

Technical Field

The invention relates to a microarray, an imaging system and a method for microarray imaging.

Description of Related Art

A microarray technology has been widely used in the study of genetics, proteomics, pharmaceutical research and clinical detection. The quality of the microarray images plays an important role in the detection results. With the development of the biotechnology industry, the size of each detection area of the microarray is decreasing and the number of the detection areas of the microarray is increasing, so that the demands for higher accuracy and higher sample throughput are increasing. Therefore, providing an imaging system and a method for microarray imaging with high image resolution and high scan speed is required.

SUMMARY

The present invention provides a microarray which includes at least one mark having multiple functions.

The present invention also provides an imaging system and a method for microarray imaging which are capable of achieving high scan speed.

According to an embodiment of the invention, a microarray including a plurality of detection areas and at least one mark is provided. The plurality of the detection areas are arranged in an array. The at least one mark is disposed among or beside the plurality of the detection areas. The at least one mark is configured for at least one of image focusing, positioning and splicing, wherein the at least one mark comprises a plurality of grid dots distributed in an area, the area comprises a plurality of zones arranged in an array, each of the plurality of the grid dots is disposed in one of the plurality of the zones, a number of the plurality of the grid dots is less than a number of the plurality of the zones, and the plurality of the grid dots form a two-dimensional pattern.

In an embodiment of the invention, the two-dimensional pattern is an X-shaped pattern, an L-shaped pattern, a checkerboard pattern, a mesh-like pattern, or a maze-like pattern.

According to an embodiment of the invention, an imaging system including an exciting light source, a light guide, a microarray and an image capturing device is provided. The exciting light source is configured to emit light. The light guide is connected with the exciting light source to guide the light. The microarray is disposed on a transmission path of the light. The microarray includes a plurality of detection areas and at least one mark, wherein the at least one mark is configured for at least one of image focusing, positioning and splicing as well as comprises a plurality of grid dots distributed in an area, the area comprises a plurality of zones arranged in an array, each of the plurality of the grid dots is disposed in one of the plurality of the zones, a number of the plurality of the grid dots is less than a number of the plurality of the zones, and the plurality of the grid dots form a two-dimensional pattern. The image capturing device is configured to capture an image of the microarray based on the at least one mark.

In an embodiment of the invention, the image capturing device is disposed under the microarray.

In an embodiment of the invention, the imaging system further includes a carrier tray and a radio frequency identification tag mounted on the carrier tray, wherein the microarray is disposed on the carrier tray.

In an embodiment of the invention, the imaging system further includes a filter element disposed on the transmission path of the light from the exciting light source. The filter element includes a transparent portion and a filter portion. When the transparent portion is switched into the transmission path of the light, the transparent portion is adopted to allow the light to pass through and the light is transmitted to the microarray. When the filter portion is switched into the transmission path of the light, the filter portion is adopted to allow a portion of the light with specific wavelengths to pass through and the portion of the light is transmitted to the microarray, wherein the plurality of the detection areas are adopted to emit fluorescence when excited by the portion of the light.

In an embodiment of the invention, the filter element includes a filter sheet disposed in the transparent portion, and the filter sheet is configured to decrease light intensity of the light.

In an embodiment of the invention, the imaging system further includes an objective disposed between the microarray and the image capturing device.

According to an embodiment of the invention, a method for microarray imaging is provided. The method includes providing a microarray comprising a plurality of detection areas and a plurality of marks; switching to a first light mode and performing coarse focusing on the plurality of the marks; performing fine focusing on the plurality of the marks; and switching to a second light mode and capturing a plurality of images of the microarray based on the fine focusing result.

In an embodiment of the invention, the method further includes adjusting a captured region of the microarray based on the plurality of the marks.

In an embodiment of the invention, the method further includes adjusting the plurality of the images based on the plurality of the marks thereupon when the plurality of the marks are tilted, rotated or out of position.

In an embodiment of the invention, the plurality of the images correspond to different regions of the microarray respectively, and the method further includes splicing the plurality of the images together based on the plurality of the marks thereupon.

In an embodiment of the invention, each of the plurality of the marks is configured for at least one of image focusing, positioning and splicing as well as comprises a plurality of grid dots distributed in an area, the area comprises a plurality of zones arranged in an array, each of the plurality of the grid dots is disposed in one of the plurality of the zones, a number of the plurality of the grid dots is less than a number of the plurality of the zones, and the plurality of the grid dots form a two-dimensional pattern.

In an embodiment of the invention, the image positioning through the plurality of the marks includes at least one of displacement adjustment and rotation adjustment.

In an embodiment of the invention, the plurality of the marks are opaque.

In an embodiment of the invention, each of the plurality of the marks is encoded with at least one of location information and detection information.

Based on the above, the microarray provided by one of the embodiments of the invention includes at least one mark. Since the at least one mark has a plurality of grid dots forming a two-dimensional pattern, the at least one mark may be used for image focusing, positioning and splicing. Besides, the imaging system and the method for microarray imaging provided by one of the embodiments of the invention use the aforementioned microarray, and therefore are capable of achieving high scan speed.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described may be used in the practice or testing of the invention, the exemplary methods, devices and materials are now described.

Figure 1:
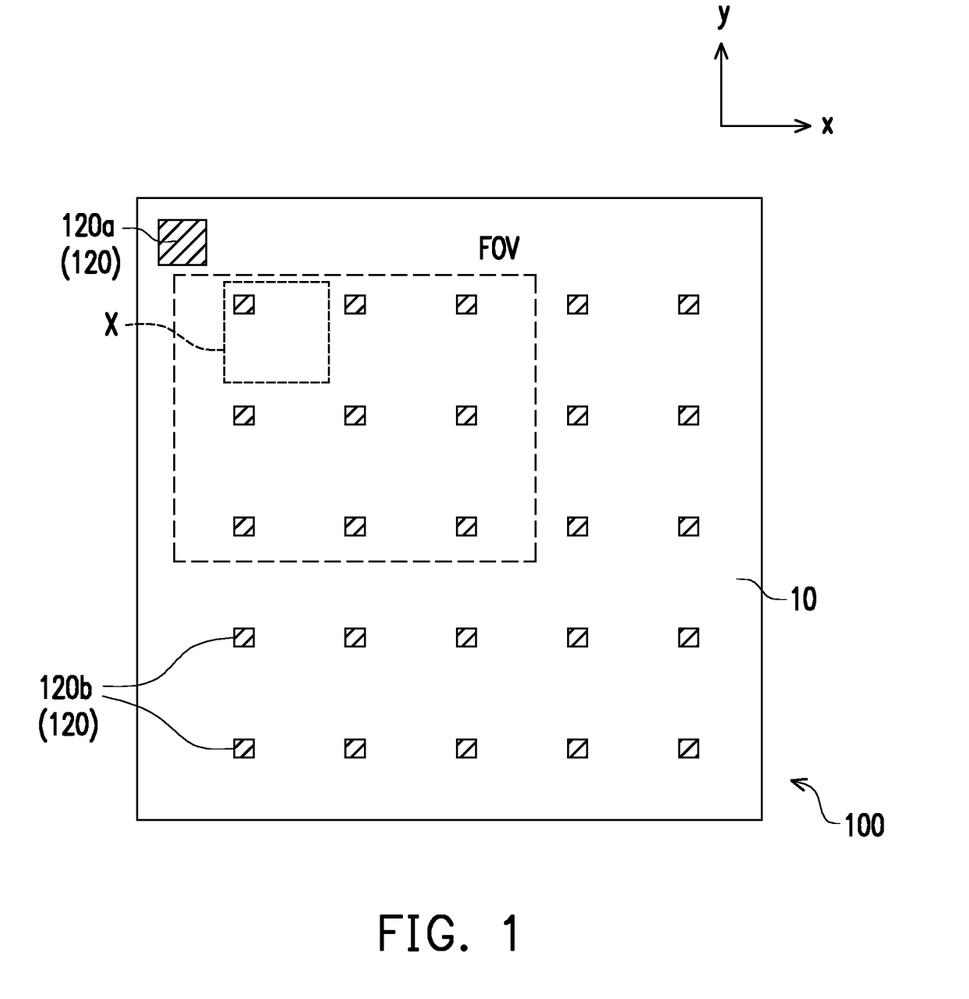
FIG. 1 is a schematic diagram illustrating a microarray according to an embodiment of the invention.
Figure 2:
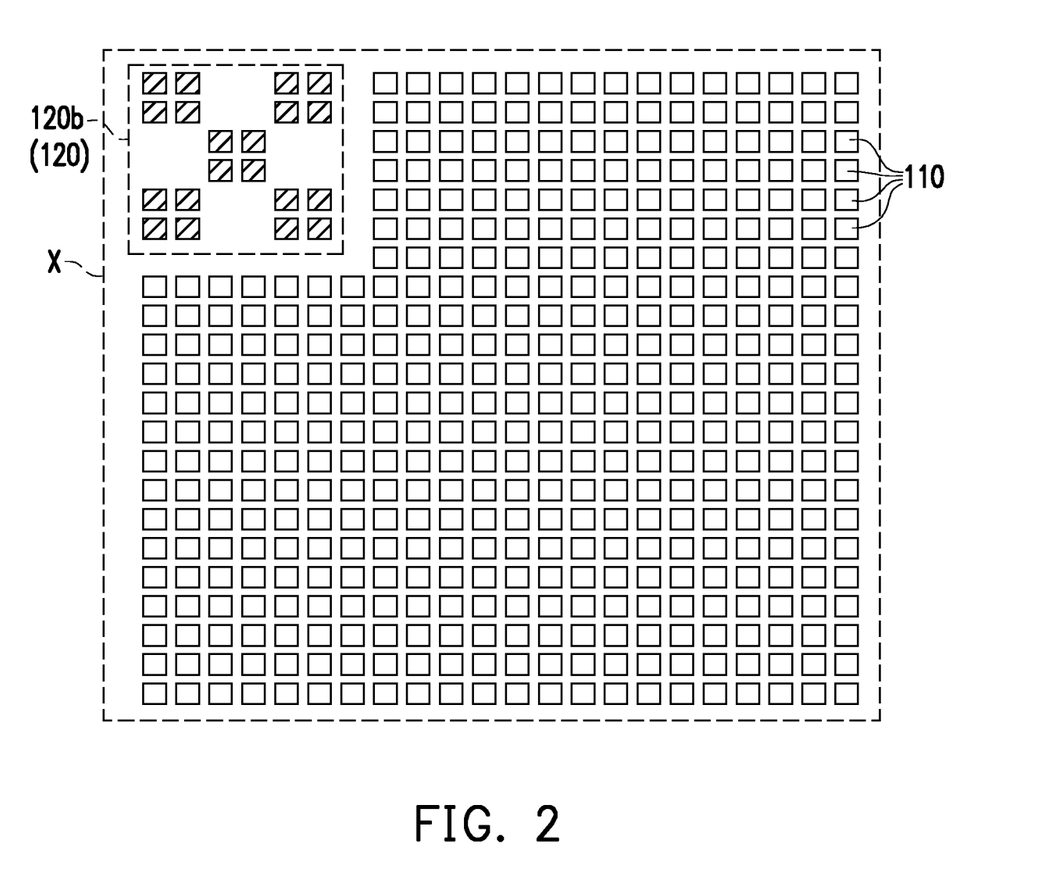
FIG. 2 is a partially enlarged schematic diagram of a region X of the FIG. 1.

FIG. 1 is a schematic diagram illustrating a microarray according to an embodiment of the invention. FIG. 2 is a partially enlarged schematic diagram of a region X of the FIG. 1. FIGS. 3A to 3D are schematic diagrams illustrating some marks with different patterns according to some embodiments of the invention. Referring to FIGS. 1 and 2 first, a microarray 100 of the present embodiment includes a plurality of detection areas 110 (shown in FIG. 2) and at least one mark 120 (for example, FIG. 1 illustrates a plurality of marks 120) on a substrate 10. The plurality of the detection areas 110 are substantially arranged in an array, for example. The plurality of the marks 120 are disposed among or beside the plurality of the detection areas 110, and the plurality of the marks 120 are configured for at least one of image focusing, positioning and splicing. For example, the marks 120 may be disposed on the corner of the substrate 10 (such as the mark 120a illustrated in FIG. 1), or the marks 120 may be spread on the surface of the substrate 10 (such as the marks 120b illustrated in FIG. 1). Besides, the plurality of the marks 120 may be disposed in a regular arrangement or random arrangement, and the invention is not limit thereto. In some embodiment, the plurality of the marks 120 may be disposed on the scribe line of the substrate 10. In the present embodiment, the microarray 100 may be a nucleic acid probe array, a protein array or a peptide array, and so on. The plurality of the detection areas (which may be also called "pixels") 110 may contain fluorescence labels, and the size of each detection area 110 is about 0.3 micron, for example.

Referring to FIGS. 2 and 3A to 3D, each of the marks 120 includes a plurality of grid dots GD (indicated in FIG. 3A), and the plurality of the grid dots GD form a two-dimensional pattern. To be detail, the plurality of the grid dots GD are distributed in an area A (indicated in FIG. 3A), and each of the grid dots GD of the mark 120 is separated from each other. The area A includes a plurality of zones Z (indicated in FIG. 3A) arranged in an array, and each of the plurality of the grid dots GD is disposed in one of the plurality of the zones Z, wherein a number of the plurality of the grid dots GD is less than a number of the plurality of the zones Z. In other words, there is no grid dot GD in at least one of the plurality of the zones Z (i.e. there is at least one empty zone). For example, the plurality of the zones Z may be arranged in rows and columns. A number of the rows or columns may range from 5 to 10, for example. Each zone Z includes at most one grid dot GD. In the present embodiment, the size of each grid dot GD of the mark 120 is substantially the same as the size of each detection area 110 (or the size of one pixel). The size of one mark 120 may range from about 1 micron to about 100 microns, for example.

Figure 3A:
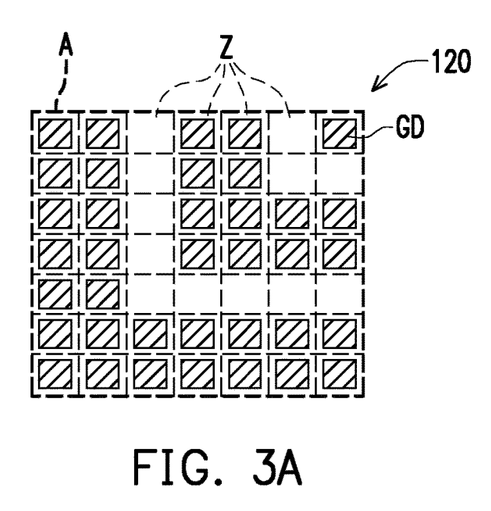
FIGS. 3A to 3D are schematic diagrams illustrating some marks with different patterns according to some embodiments of the invention.

It is noted that the plurality of the grid dots GD are distributed in the area A, therefore the first raw, the last raw, the first column, or the last column of the zones Z may not be empty. That is, the first raw of the zones Z may include at least one grid dot GD, the last raw of the zones Z may include at least one grid dot GD, the first column of the zones Z may include at least one grid dot GD, as well as the last column of the zones Z may include at least one grid dot GD.

Figure 3B:
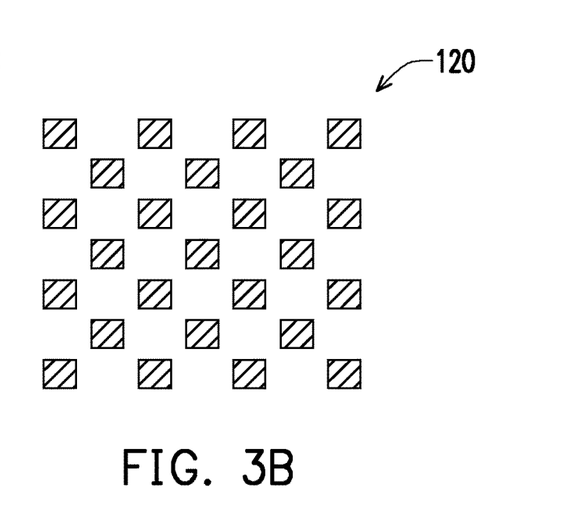
Figure 3C:
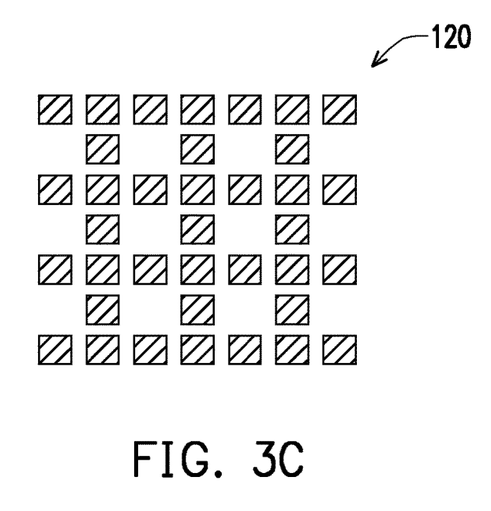
Figure 3D:
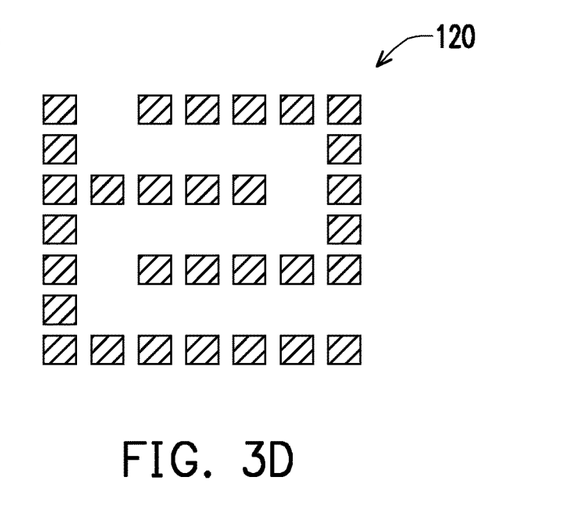

The two-dimensional pattern of each of the marks 120 may have different shapes and forms. For example, the two-dimensional pattern may be an X-shaped pattern (as shown in FIG. 2), an L-shaped pattern (as shown in FIG. 3A), a checkerboard pattern (as shown in FIG. 3B), a mesh-like pattern (as shown in FIG. 3C), or a maze-like pattern (as shown in FIG. 3D), but is not limited thereto. In some embodiments, the plurality of the marks 120 may be patterned through a photolithography process and an etching process. In the present embodiment, since each of the marks 120 has a plurality of grid dots GD forming a two-dimensional pattern which is identified easily, the plurality of the marks 120 may be used for image focusing, positioning and splicing.

In some embodiments, the plurality of the marks 120 may be encoded with specific information, such as, location information for splicing. For example, each of the plurality of the marks 120 may be encoded with information about the location thereof, and also may be encoded with information about the locations of other marks 120. When one of the marks 120 is found, the locations of other marks 120 adjacent to it may be estimated based on the encoded information. Besides, the plurality of the marks 120 may be encoded with detection information for splicing, for example, information about the detection type (e.g., DNA, RNA, peptides, or proteins . . . ) or the examined subject (e.g., name, age, or gender . . . ). In some embodiments, the plurality of the marks 120 may not be directly encoded with information, and the image positioning through the plurality of the marks 120 is performed by the specially designated two-dimensional patterns of the plurality of the marks 120. For example, one mark 120 with a specially designated two-dimensional pattern (e.g. X-shaped, L-shaped pattern, checkerboard pattern, mesh-like pattern, and so on) may be disposed on a specific location of the substrate 10, and when the mark 120 with the specially designated two-dimensional pattern is found, the specific location may be identified.

In addition, the plurality of the marks 120 are opaque, and the substrate 10 is transparent. For example, a material of the plurality of the marks 120 may be metal (e.g., chrome) or other suitable materials which are not transparent, and a material of the substrate 10 may be glass or other suitable materials. Due to the transmittance difference, there are sharp boundaries between the opaque marks 120 and the transparent substrate 10 when the microarray 100 is illuminated, and thereby accuracy of focusing performed on the marks 120 may be enhanced. In some embodiments, the substrate 10 is a silicon substrate.

In some embodiments, when the microarray 100 is placed together with some similar microarrays, some marks 120 (such as the mark 120a in FIG. 1) may be used for identifying the position of the microarray 100 among the other similar microarrays. In some embodiments, when a plurality of images corresponding to different regions of the microarray 100 respectively are captured, some marks 120 (such as the marks 120b in FIG. 1) may be used for identifying the corresponding regions of the microarray 100 and may be used for image splicing. In some embodiments, the mark 120a and the marks 120b may have the same or different function. In some embodiments, if the mark 120 is not used for image splicing, the microarray 100 may have only one mark 120.

Figure 4:
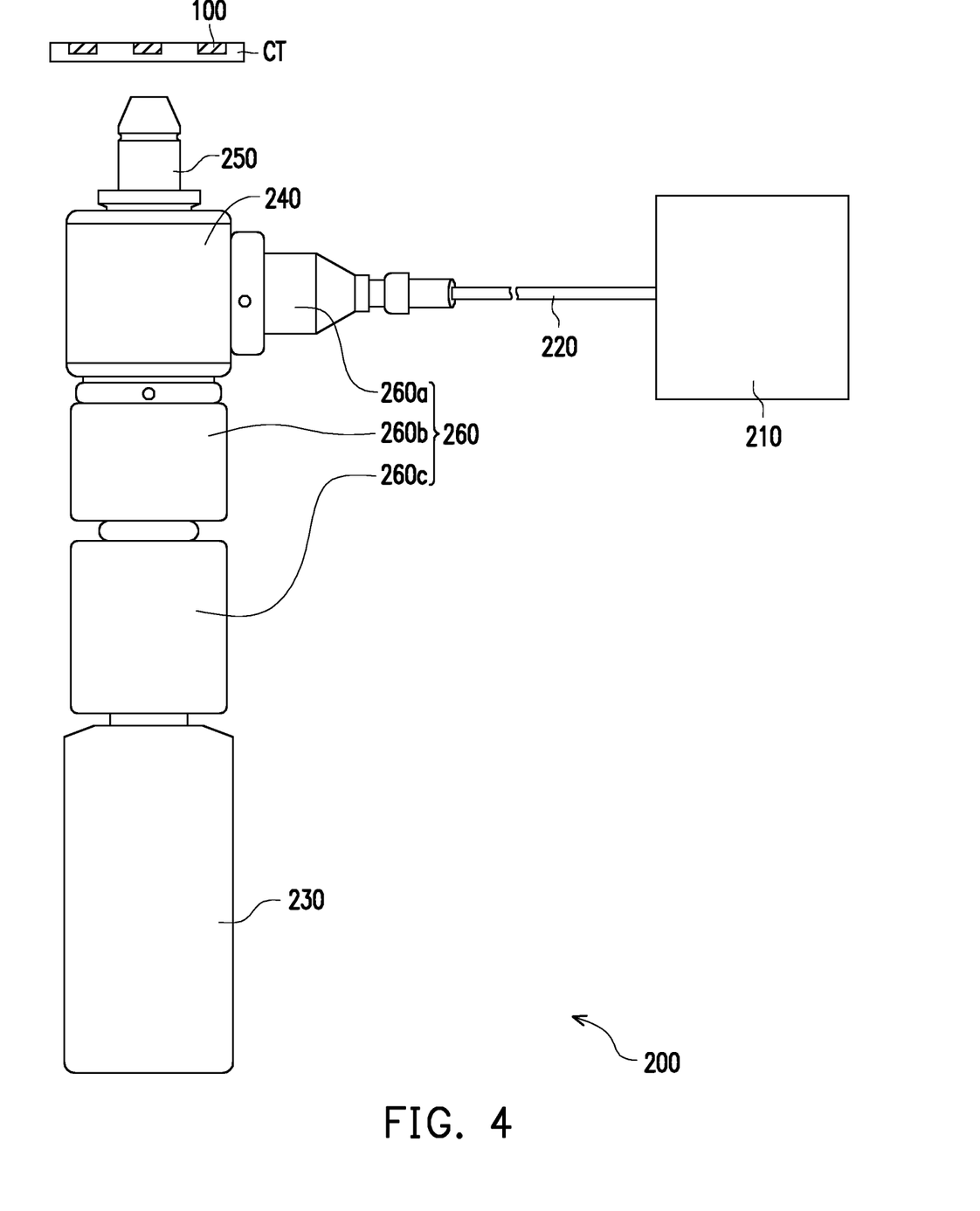
FIG. 4 is a schematic diagram illustrating an imaging system according to an embodiment of the invention.

FIG. 4 is a schematic diagram illustrating an imaging system according to an embodiment of the invention. Referring to FIG. 4, an imaging system 200 of the present embodiment includes an exciting light source 210, a light guide 220, the microarray 100 described above and an image capturing device 230. The exciting light source 210 is configured to emit light. The light guide 220 is connected with the exciting light source 210 to guide the light. The microarray 100 is disposed on a transmission path of the light which is transmitted through the light guide 220. The image capturing device 230 is configured to capture an image of the microarray 100 based on the plurality of the marks 120. To be specific, after the light from the exciting light source 210 passes through the light guide 220, the light may be directed upwardly to illuminate the microarray 100. The image capturing device 230 is disposed under the microarray 100 to capture the image of the microarray 100. In the present embodiment, the image capturing device 230 may include a charge coupled device (CCD) image sensor or a complementary metal-oxide-semiconductor (CMOS) image sensor, for example.

In the present embodiment, the exciting light source 210 may include a high power light-emitting diode (LED) module, and the light emitted from the exciting light source 210 is in a wide range of wavelengths. For example, the light may have visible and ultraviolet wavelengths, but is not limited thereto. In comparison with the known imaging system (such as using laser diodes or lamps), the imaging system 100 of the present embodiment using LED light source have the advantages of compact sizes and lower costs.

In the present embodiment, the image capturing device 230 is disposed under the microarray 100. In other words, the microarray 100 is disposed above the image capturing device 230. Since the plurality of the marks 120 are opaque, the light from the light guide 220 may be designed to travel upwardly to the microarray 100, such that the marks 120 may be found by the image capturing device 230 more easily.

In the present embodiment, the imaging system 200 further includes a filter element 240 disposed on the transmission path of the light from the exciting light source 210. The filter element 240 is disposed between the microarray 100 and the image capturing device 230. The filter element 240 includes a transparent portion and a filter portion which may be switched into the transmission path of the light by turns. In some embodiments, the transparent portion is adopted to allow all of the light with all wavelengths to pass through, and the filter portion is adopted to allow a portion of the light with specific wavelengths to pass through.

To be specific, in a first light mode, the transparent portion is switched into the transmission path of the light from the exciting light source 210, and all of the light passes through the transparent portion so as to be transmitted to the microarray 100. In the first light mode, the image capturing device 230 may find the plurality of the marks 120 to perform image positioning and focusing. In a second light mode, the filter portion is switched into the transmission path of the light from the exciting light source 210, and a portion of the light with specific wavelengths passes through the filter portion so as to be transmitted to the microarray 100. In the second light mode, if specific reactions (e.g., hybridization) occur in some of the detection areas 110 of the microarray 100, the detection areas 110 may be excited by the portion of the light and emit fluorescence, and the image capturing device 230 may capture the fluorescence image of the microarray 100. In the present embodiment, the portion of the light may have shorter wavelengths (e.g., ultraviolet wavelengths) than the wavelengths of the fluorescence emitted from the detection areas 110. In some embodiments, there may be two or more kinds of fluorescence labels in the detection areas 110, and the fluorescence emitted from the detection areas 110 may thus have different colors.

In addition, in some embodiments, the filter element 240 includes a filter sheet disposed in the transparent portion, and the filter sheet is configured to decrease light intensity of the light, such that the fluorescence decay may be prevented during the first light mode.

In the present embodiment, the imaging system 200 further includes an objective 250 and a lens module 260. The objective 250 is disposed between the microarray 100 and the filter element 240. The lens module 260 includes a lens element 260a, a lens element 260b and a lens element 260c. The lens element 260a is disposed between the light guide 220 and the filter element 240 and is used for adopting the light from the light guide 220 to pass through and focusing the light. The lens element 260b and the lens element 260c are disposed between the objective 250 and the image capturing device 240 and are used for adjusting a path of the light from the microarray 100 to the image capturing device 230 in internal of the imaging system 200. In the present embodiment, for high image resolution application, the magnification of the objective 250 may be 10× or more, for example.

It should be noted that the number of the microarrays 100 may be more than one, and the plurality of the microarrays 100 may be placed on a carrier tray CT and may be arranged in an array. The imaging system 200 may include a tray holder (not illustrated) to receive the carrier tray CT.

In the present embodiment, a radio frequency identification (RFID) tag may be mounted on the carrier tray CT. The RFID tag may contain electronically-stored information about the plurality of the microarrays 100. For example, the RFID tag may contain identification code of the plurality of the microarrays 100. In some embodiments, the RFID tag may contain information about the scanning sequence of the plurality of the microarrays 100. In some embodiments, the RFID tag may contain information about whether each of the plurality of the microarrays 100 is effective or not, such that some ineffective microarrays 100 may be prevented from being scanning, which may improve scan speed of the image system 200. In some alternative embodiments, RFID tag may be omitted.

In the present embodiment, the imaging system 200 further includes a controller (not illustrated) electrically connected to the image capturing device 230 and the filter element 240. The controller is configured to control the image capturing device 230 to perform image focusing and/or positioning, control the filter element 240 to switch to different light modes, and/or performs image splicing. In some embodiments, the controller is, for example, a central processing unit (CPU), a microprocessor, a digital signal processor (DSP), a programmable controller, a programmable logic device (PLD), or other similar devices, or a combination of the said devices, which are not particularly limited by the invention. Further, in some embodiments, each of the functions of the controller may be implemented as a plurality of program codes. These program codes will be stored in a memory, so that these program codes may be executed by the controller. Alternatively, in some embodiments, each of the functions of the controller may be implemented as one or more circuits. The invention is not intended to limit whether each of the functions of the controller is implemented by ways of software or hardware.

Figure 5:
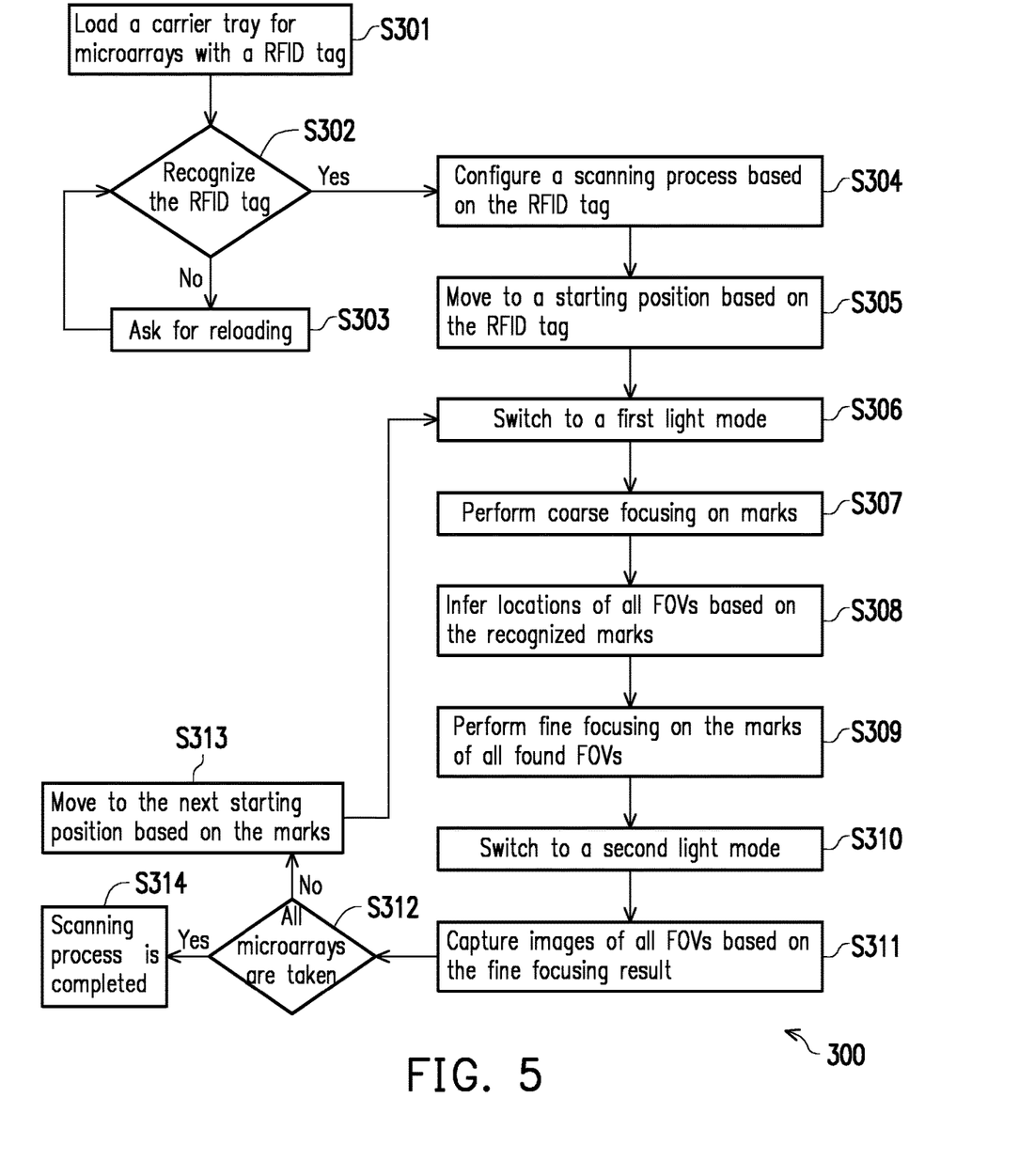
FIG. 5 is a schematic flow diagram illustrating a method for microarray imaging according to an embodiment of the invention.

FIG. 5 is a schematic flow diagram illustrating a method for microarray imaging according to an embodiment of the invention. It is understood that additional steps may be performed before, during, and/or after the method 300 depicted in FIG. 5. In some embodiments, the method 300 is usable to generate images of microarray, such as the images of the detection areas 110 of the microarray 100 aforementioned. In some embodiments, the method 300 is performed by an imaging system, such as the imaging system 200 aforementioned.

Referring to FIG. 5, in step S301, a carrier tray CT for microarrays 100 with a RFID tag is loaded. In the present embodiment, a plurality of the microarrays 100 are provided and placed on a carrier tray CT, and the carrier tray CT is placed onto a tray holder of the imaging system 200. The RFID tag may be mounted on the carrier tray CT. Since the RFID tag may contain identification code of the carrier tray CT for the microarrays 100, in step S302, the RFID tag is recognized to identify the plurality of the microarrays 100. If the carrier tray CT for microarrays 100 is not the one which is proposed to be detected, in step S303, another carrier tray for microarrays may be reloaded. If the carrier tray CT for microarrays 100 is the one which is proposed to be detected, in step S304, a scanning process is configured based on the RFID tag.

Since the RFID tag may store the scanning sequence of the plurality of the microarrays 100, in step S305, based on the RFID tag, the focusing target of the image capturing device 230 moves to a starting position where the predetermined microarray 100 is located, and the scanning process starts. First, in step S306, the image system 200 is switched to a first light mode. The transparent portion of the filter element 240 is switched into the transmission path of the light from the exciting light source 210, and all of the light passes through the transparent portion so as to be transmitted to the microarray 100.

In step S307, coarse focusing on the marks 120 of the microarray 100 is performed with the first light mode. In detail, the image capturing device 230 finds all the marks 120 in a field of view (FOV, shown in FIG. 1) of the microarray 100 and performs the coarse focusing on the marks 120. In the present embodiment, the FOV may merely cover a portion of the microarray 100, and in step S308, based on the marks 120 in the FOV, locations of all FOVs corresponding to different regions of the microarray 100 may be respectively inferred by the encoded location information or the specially designated two-dimensional pattern of the marks 120. Then, in step S309, fine focusing on the marks in all found FOVs is performed to fine the best focal positions (where objects appear sharpest in images) of all FOVs. In the present embodiment, the focal positions of the coarse focusing are within 10 μm from the best focal positions, and the focal positions of the coarse focusing are approximately within the depth of field (DOF). In some embodiments, when one FOV covers the entire microarray 100, step S308 may be omitted.

In step S310, the image system 200 is switched to a second light mode. The filter portion is switched into the transmission path of the light from the exciting light source 210, and a portion of the light with specific wavelengths passes through the filter portion so as to be transmitted to the microarray 100. The plurality of the detection areas 110 are adopted to emit fluorescence when excited by the portion of the light.

In step S311, images of all FOVs of the microarray are captured based on the fine focusing result. As mentioned above, in the first light mode, the coarse focusing is performed to infer the locations of all FOVs corresponding to different regions of the microarray 100 based on the marks 120 which are found in the beginning, and the fine focusing is performed to estimate the best focal positions of all FOVs. Then, in the second light mode, the image capturing device 230 captures a plurality of fluorescence images of the microarray 100 corresponding to all FOVs respectively based on the best focal positions of all FOVs. In some embodiments, each of the images may have a resolution greater than 5 million pixels. In some embodiments, each of the images may have a resolution greater than 9 million pixels.

To sum up, the method 300 performs the coarse and fine focusing on all FOVs to find the best focal positions in the first light mode, and then captures images of all FOVs based on the fine focusing result in the second light mode. In comparison with the method which performs focusing on one FOV once and directly captures one image, the method 300 is more effective due to less switching time between the transparent portion and the filter portion of the filter element 240, which helps to speed up the scan speed.

In step S312, it is ascertained that whether all microarrays 100 on the carrier tray CT are taken or not. If there is any microarray 100 not being captured, in step S313, the focusing target of the image capturing device 230 moves to the next starting position based on the marks 120 and go to step S306. If all microarrays 100 are captured, in step S314, the scanning process is completed.

It is noted that since the RFID tag may contain information about the effective or ineffective microarrays 100, the ineffective microarrays 100 may not be scanned to avoid wasting time and thus speed up the scanning process in the method 300 of the present embodiment.

In some embodiments, the method 300 further includes splicing the plurality of the images corresponding to different regions (e.g., different FOVs) of the microarray 100 together based on the plurality of the marks 120 thereupon (i.e. the marks 120 in the images). The controller may adjust the plurality of the images based on the plurality of the marks 120 thereupon (i.e. the marks 120 in the images) and perform image splicing.

In some embodiments, the image positioning through the plurality of the marks 120 includes displacement adjustment. For example, before capturing the images of the microarray 100, if a captured region (i.e. a FOV) of the microarray 100 is shifted, the image capturing device 230 may adjust the captured region in x or y direction based on the plurality of the marks 120 in the captured region. Besides, after capturing the images of the microarray 100, if images of the plurality of the marks 120 are out of position, the controller may adjust the images of the microarray 100 based on the plurality of the marks 120 thereupon (i.e. the marks 120 in the images) for image splicing. In some embodiments, the image positioning through the plurality of the marks 120 includes rotation adjustment. For example, if images of the plurality of the marks 120 are tilted or rotated, the controller may adjust the images of the microarray 100 based on the plurality of the marks 120 thereupon (i.e. the marks 120 in the images) for image splicing. In some embodiments, some marks 120 may be visible in the second light mode, which may enhance the accuracy of the image splicing.

To sum up, the microarray provided by one of the embodiments of the invention includes at least one mark. Since the at least one mark has a plurality of grid dots forming a two-dimensional pattern, the at least one mark may be used for image focusing, positioning and/or splicing. Besides, the imaging system and the method for microarray imaging provided by one of the embodiments of the invention use the aforementioned microarray, and therefore are capable of achieving high scan speed.

It will be apparent to those skilled in the art that various modifications and variations may be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A microarray comprising: a plurality of detection areas arranged in an array; and at least one mark disposed among or beside the plurality of the detection areas, the at least one mark configured for at least one of image focusing, positioning and splicing, wherein the at least one mark comprises a plurality of grid dots distributed in an area, the area comprises a plurality of zones arranged in an array, each of the plurality of the grid dots is disposed in one of the plurality of the zones, a number of the plurality of the grid dots is less than a number of the plurality of the zones, and the plurality of the grid dots form a two-dimensional pattern, wherein the microarray is configured to switch to a first light mode and perform coarse focusing on the at least one mark, perform fine focusing on the at least one mark, and switch to a second light mode and capture an image of the microarray based on the fine focusing result.

2. The microarray as claimed in claim 1, wherein the at least one mark is opaque.

3. The microarray as claimed in claim 1, wherein the at least one mark is encoded with at least one of location information and detection information for splicing.

4. The microarray as claimed in claim 1, wherein the two-dimensional pattern is an X-shaped pattern, an L-shaped pattern, a checkerboard pattern, a mesh-like pattern, or a maze-like pattern.

5. An imaging system comprising: an exciting light source configured to emit light; a light guide connected with the exciting light source to guide the light; a microarray disposed on a transmission path of the light, the microarray comprising a plurality of detection areas and at least one mark, wherein the at least one mark is configured for at least one of image focusing, positioning and splicing as well as comprises a plurality of grid dots distributed in an area, the area comprises a plurality of zones arranged in an array, each of the plurality of the grid dots is disposed in one of the plurality of the zones, a number of the plurality of the grid dots is less than a number of the plurality of the zones, and the plurality of the grid dots form a two-dimensional pattern, wherein the microarray is configured to switch to a first light mode and perform coarse focusing on the at least one mark, perform fine focusing on the at least one mark, and switch to a second light mode; and an image capturing device configured to capture an image of the microarray based on the at least one mark the fine focusing result.

6. The imaging system as claimed in claim 5, wherein the image capturing device is disposed under the microarray.

7. The imaging system as claimed in claim 5, further comprising a carrier tray and a radio frequency identification tag mounted on the carrier tray, wherein the microarray is disposed on the carrier tray.

8. The imaging system as claimed in claim 5, wherein the at least one mark is opaque.

9. The imaging system as claimed in claim 5, wherein the at least one mark is encoded with at least one of location information and detection information for splicing.

10. The imaging system as claimed in claim 5, further comprising a filter element disposed on the transmission path of the light from the exciting light source, the filter element comprising a transparent portion and a filter portion, wherein
when the transparent portion is switched into the transmission path of the light, the transparent portion is adopted to allow the light with all wavelengths to pass through and the light is transmitted to the microarray, and
when the filter portion is switched into the transmission path of the light, the filter portion is adopted to allow a portion of the light with specific wavelengths to pass through and the portion of the light is transmitted to the microarray, wherein the plurality of the detection areas are adopted to emit fluorescence when excited by the portion of the light.

11. The imaging system as claimed in claim 10, wherein the filter element comprises a filter sheet disposed in the transparent portion, and the filter sheet is configured to decrease light intensity of the light.

12. The imaging system as claimed in claim 5, further comprising an objective disposed between the microarray and the image capturing device.

13. A method for microarray imaging, comprising: providing a microarray comprising a plurality of detection areas and a plurality of marks, wherein each of the plurality of the marks is configured for at least one of image focusing, positioning and splicing, each of the plurality of the marks comprises a plurality of grid dots distributed in an area, the area comprises a plurality of zones arranged in an array, each of the plurality of the grid dots is disposed in one of the plurality of the zones, a number of the plurality of the grid dots is less than a number of the plurality of the zones, and the plurality of the grid dots form a two-dimensional pattern; switching to a first light mode and performing coarse focusing on the plurality of the marks; performing fine focusing on the plurality of the marks; and switching to a second light mode and capturing a plurality of images of the microarray based on the fine focusing result.

14. The method as claimed in claim 13, further comprising adjusting a captured region of the microarray based on the plurality of the marks.

15. The method as claimed in claim 13, further comprising adjusting the plurality of the images based on the plurality of the marks thereupon when the plurality of the marks are tilted, rotated or out of position.

16. The method as claimed in claim 13, wherein the plurality of the images correspond to different regions of the microarray respectively, and the method further comprises splicing the plurality of the images together based on the plurality of the marks thereupon.

17. The method as claimed in claim 13, wherein the image positioning through the plurality of the marks includes at least one of displacement adjustment and rotation adjustment.

18. The method as claimed in claim 13, wherein the plurality of the marks are opaque.

19. The method as claimed in claim 13, wherein each of the plurality of the marks is encoded with at least one of location information and detection information.

* * * * *